No. 714,378. Patented Nov. 25, 1902.
H. F. JURS.
ROTARY HARROW.
(Application filed May 31, 1902.)
(No Model.)
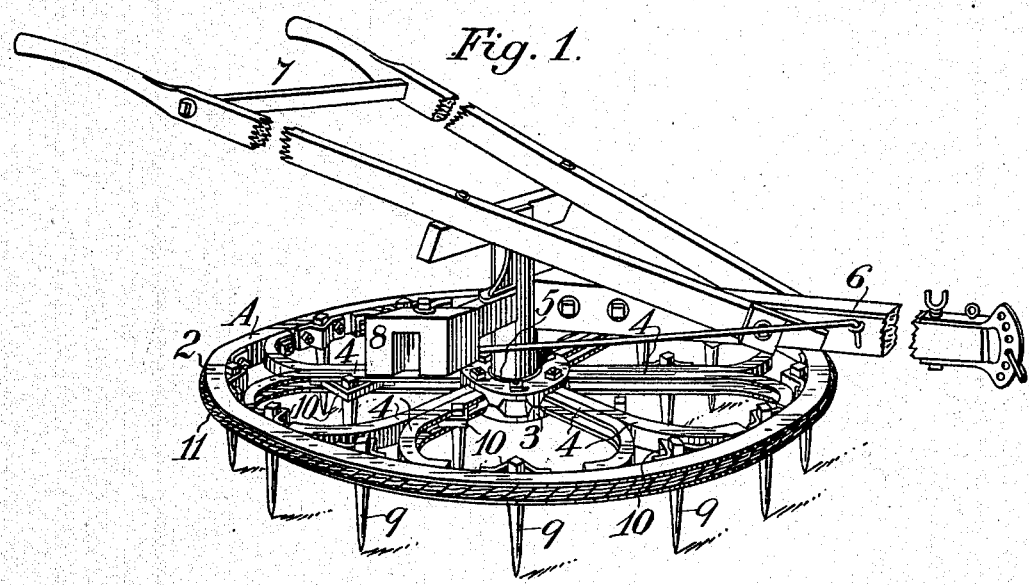
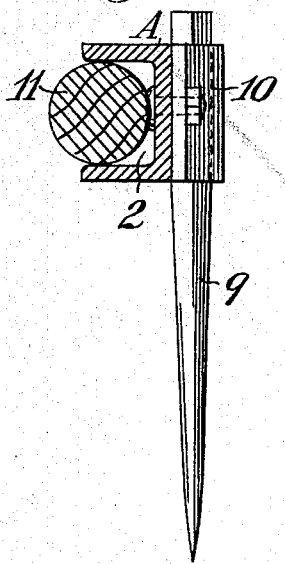
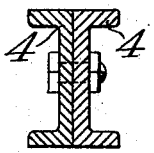
Witnesses,
E. A. Brandau
Inventor,
Henry F. Jurs
By Dewey Strong
Atty
THE NORRIS PETERS CO., PHOTO-LITHO., WASHINGTON, D. C.

UNITED STATES PATENT OFFICE.

HENRY F. JURS, OF BENICIA, CALIFORNIA, ASSIGNOR TO BAKER & HAMILTON, OF SAN FRANCISCO, CALIFORNIA, A CORPORATION.

ROTARY HARROW.

SPECIFICATION forming part of Letters Patent No. 714,378, dated November 25, 1902.

Application filed May 31, 1902. Serial No. 109,675. (No model.)

*To all whom it may concern:*

Be it known that I, HENRY F. JURS, a citizen of the United States, residing at Benicia, county of Solano, State of California, have invented an Improvement in Rotary Harrows; and I hereby declare the following to be a full, clear, and exact description of the same.

My invention relates to improvements in agricultural implements of the type known as "rotary harrows."

The particular object is to provide a device which will be considerably stronger than such harrows ordinarily are and which will also be simple and economical of construction and which, further, may be operated around trees and vines without injuring the bark of the latter.

It consists in the combination of a circular revoluble toothed frame having forked or substantially Y-shaped spokes, a novel means of securing the teeth to the frame, and a projecting cushion on the frame, whereby the metal thereof is prevented from coming in contact with trees and the like.

It also comprises details which will be more fully set forth hereinafter, having reference to the accompanying drawings, in which—

Figure 1 is a perspective view of my invention. Fig. 2 is a transverse section of the circular frame and rope. Fig. 3 is a transverse section of one of the spokes.

A represents a circular frame constructed of channel-iron, with the groove 2 on the outside. This frame is supported from a central hub 3 by means of the forked or substantially Y-shaped radiating bars or spokes 4. Each of the latter consists of two pieces of channel-iron placed back to back, with their inner ends bolted or otherwise rigidly secured together and having their outer ends divergently curved and attached to the frame A at widely-separated points. The hub 3 is of ordinary construction and consists of two disk plates bolted together, embracing the ends of the spokes 4 and secured to a central revoluble shaft 5. The draft-bar 6 is pivoted to this shaft, and the machine is guided by the operator by means of the handles 7. A swinging weight-arm 8 serves to adjust the rate of rotation of the frame. The teeth 9 are adjustably secured to the frame A by means of the bands or clamps 10. These latter are bent so each has a transverse channel, the walls of which are adapted to embrace two sides of a tooth and hold it with one corner bearing against the frame.

Harrow-teeth are generally made rectangular in cross-section, and the usual manner of holding them in harrow-frames is to perforate the frame, insert the teeth, and secure them in the frame permanently without any means of adjustment.

By reason of the clamps 10 the teeth are held with a diagonal in the line of rotation of the frame, whereby an edge of a tooth is always presented to the furrow. The teeth are quickly inserted or removed, are adjustable to different depths of soil and character of work, and, moreover, are capable of being so locked as not to work loose. The forking of the spokes 4 gives a rigidity of structure not before attained in machines of this class, which are subjected naturally to a great deal of jolting, strain, and general hard usage. As these machines are used particularly in orchards and vineyards for the purpose of pulverizing the soil and removing the weeds, it is necessary to work under, around, and close to the trees and vines, and it not infrequently happens that a machine strikes against the tree or vine, and if the iron frame is unprotected the bark will be injured, so as often to endanger the life of the tree.

Accordingly I have devised the frame A of channel-iron, as herein described. Into the channel 2 thereof I insert a rope 11 or like resilient material something after the manner of rubber tires on vehicle-wheels, which acts as a buffer or cushion to obviate abrasion or injury by the contact of the harrow with the tree.

Having thus described my invention, what I claim, and desire to secure by Letters Patent, is—

1. A rotary harrow consisting in combination of a centrally-pivoted, rotatable toothed frame, draft mechanism, handles for guiding the device, and cushioning means upon the frame whereby the metal thereof is prevented from coming in contact with trees and the like.

2. In a rotary harrow, a rotatable toothed frame having peripheral flanges and a projecting resilient cushion material contained in the channel formed between said flanges.

3. The combination in a harrow of an outer frame having a peripheral cushioning means whereby the frame is prevented from coming in contact with trees and the like, a central revoluble hub and spokes consisting each of two bars bolted together at their inner end and having their outer ends divergently curved and secured to the frame at widely-separated points.

4. A rotary harrow including an outer frame of channel-iron form, radial supports, essentially Y-shaped having the ends of the divergent portion secured to the frame, a central revoluble hub in which the united portion of said supports are seated, and an annular projecting resilient cushion material contained in the groove on the outer periphery of the frame.

In witness whereof I have hereunto set my hand.

HENRY F. JURS.

Witnesses:
S. H. NOURSE,
JESSIE C. BRODIE.